US006381571B1

(12) United States Patent
Gong et al.

(10) Patent No.: US 6,381,571 B1
(45) Date of Patent: Apr. 30, 2002

(54) SEQUENTIAL DETERMINATION OF UTTERANCE LOG-SPECTRAL MEAN BY MAXIMUM A POSTERIORI PROBABILITY ESTIMATION

(75) Inventors: Yifan Gong; Coimbatore S. Ramalingam, both of Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/293,357

(22) Filed: Apr. 16, 1999

Related U.S. Application Data

(60) Provisional application No. 60/083,926, filed on May 1, 1998.

(51) Int. Cl.[7] ........................... G01L 15/20; G01L 15/06
(52) U.S. Cl. ..................................... 704/233; 704/243
(58) Field of Search ................................. 704/233, 243, 704/254–257

(56) References Cited

U.S. PATENT DOCUMENTS 5,727,124 A * 3/1998 Lee et al. ................... 704/233
6,151,573 A * 11/2000 Gong ......................... 704/256

OTHER PUBLICATIONS

Mazin G. Rahim and Biing–Hwang Juang, "Signal Bias Removal by Maximum Likelihood Estimation for Robust Telephone Speech Recognition," *IEEE Transactions on Speech and Audio Processing*, vol. 4, No. 1, pp. 19–30, Jan. 1996.

* cited by examiner

*Primary Examiner*—David D. Knepper
(74) *Attorney, Agent, or Firm*—Robert L. Troike; Frederick J. Telecky, Jr.

(57) ABSTRACT

Utterance-based mean removal in log-domain, or in any linear transformation of log-domain, e.g., cepstral domain, is known to improve substantially a recognizer's robustness to transducer difference, channel distortion, and speaker variation. Applicants teach a sequential determination of utterance log-spectral mean by a generalized maximum a posteriori estimation. The solution is generalized to a weighted sum of the prior mean and the mean estimated from available frames where the weights are a function of the number of available frames.

5 Claims, 2 Drawing Sheets

SEQUENTIAL DETERMINATION OF UTTERANCE LOG-SPECTRAL MEAN BY MAXIMUM A POSTERIORI PROBABILITY ESTIMATION

This application claims priority under 35 USC §119(e)(1) of provisional application number 60/083,926, filed May 1, 1998.

FIELD OF THE INVENTION

This invention relates to speech recognition and more particularly to determination of utterance recognition parameter.

BACKGROUND OF THE INVENTION

Referring to FIG. 1 there is illustrated a block diagram of a speech recognition system comprising a source 13 of Hidden Markov Models (HMM) and input speech applied to a recognizer 11. The result is recognized speech such as text. One of the sources of degradation for speech recognition of the input speech is the distortion due to transducer difference, channel, and speaker variability. Because this distortion is assumed to be additive in the log domain, utterance-based mean normalization in the log domain (or in any linear transformation of log domain, for example, cepstral domain) has been proposed to improve recognizers' robustness. See, for example, S. Furui, "Cepstral Analysis Technique for Automatic Speaker Verification," *IEEE Trans. Acoust., Speech and Signal Processing*, ASSP-29(2):264–272, 1981. Due to its computational simplicity and substantial improvement in results, such mean normalization has become a standard processing technique for most recognizers.

To do such normalization, the utterance log-spectral mean must be computed over all N frames:

$$\bar{c}_N \triangleq \frac{1}{N} \sum_{i=1}^{N} c_i \qquad (1)$$

where $c_n$ is the $n^{th}$ log spectral vector. The log spectral vectors are produced by sampling the incoming speech, taking a block or window of samples, performing a discrete Fourier transform on these samples, and performing logarithm of the transform output.

The technique is not suitable for on-line real time operation because, due to the requirement of the utterance mean, the normalized vectors can not be produced until the whole utterance has been observed. In equation 1, $\bar{c}_N$ is the log-spectral vector averaged over N windows. Since N means all N frames the application to real-time system is limited.

To solve this problem, sequential estimation of the mean vector with exponential smoothing techniques has been disclosed. See M. G. Rahim and B. H. Juang, "Signal Bias Removal by Maximum Likelihood Estimation for Robust Telephone Speech Recognition," *IEEE Trans. on Speech and Audio Processing*, 4(1): Jan. 19–30, 1996. The sequential determination is that as we get more vectors we get better and better estimates as follows $$\bar{c}_n = \alpha \cdot \bar{c}_{n-1}(\text{past estimate}) + (1-\alpha) \cdot c_n(\text{current input vector}) \qquad (2)$$

and the mean-subtracted vector:

$$\hat{c}_n = c_n - \bar{c}_n \qquad (3)$$

where $\bar{c}_n$ is an estimate of mean up to frame n and $\alpha$ is a weighting value between zero and one.

Among the choices for the initial mean $\bar{c}_0$ and weighting factor a, the prior art discusses two cases.

The first is the cumulative mean removal case where $$\bar{c}_0 = 0 \text{ and } \alpha = \frac{n-1}{n} \qquad (4)$$

Equation 2 reduces to $$\bar{c}_n = \bar{m}_n \triangleq \frac{1}{n} \sum_{i=1}^{n} c_i \qquad (5)$$

In this case at time n, the mean vector is approximated by the mean of all vectors observed up to time n. For large n, Equation 5 gives a mean that is very close to the true utterance mean, i.e., it converges to the utterance mean in Equation 1. On the other hand, when $\bar{c}_0=0$, no prior knowledge of the mean is used, which will make the mean unreliable for short utterances. The second case is called exponential smoothing. The second case sets $\bar{c}_0$=mean vector over training data and $\alpha$ is between 0 and 1. (6)

Rearranging Equation 2, we get $$\bar{c}_n = \alpha^n \cdot c_0 + (1-\alpha) \sum_{i=1}^{n} \alpha^{n-i} \cdot c_n \qquad (7)$$

The second term of Equation 7 is a weighted sum of all vectors observed up to time n. Due to the exponential decay of the weights $\alpha^{n-1}$, only the immediate past observed vectors are dominant contributors to the sum, while the more distant past vectors contribute very little. Consequently, for large n the mean given by Equation 7 will not usually be close to the true utterance mean, i.e., asymptotically, exponential smoothing does not give the utterance mean.

SUMMARY OF THE INVENTION

In accordance with one embodiment of the present invention an estimate of the utterance mean is determined by maximum a posterior probability (MAP) estimation. This MAP estimation is subtracted from the log-spectral vector of the incoming signal to be applied to a speech recognizer in a speech recognition system.

DESCRIPTION OF PREFERRED EMBODIMENTS OF THE PRESENT INVENTION

Figure 1:
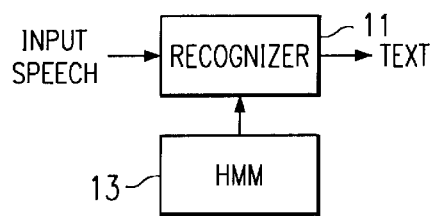
FIG. 1 is a block diagram of a prior art recognizer system.

According to one embodiment of speech recognition system, a mean estimator should have the following requirements:

It should allow integration of prior knowledge on the mean.

The estimate should be asymptotically the utterance mean, i.e., approach the utterance mean as the number of observed frames becomes large.

It has to be sequential, and computationally efficient.

In accordance with one embodiment of the present invention, an estimate of the utterance mean is achieved by maximum a posterior probability (MAP) estimation. MAP estimation allows optimal combination of newly acquired data and existing knowledge, through incorporation of prior information in the estimation of a parameter by assuming a prior distribution of it.

It is assumed that:

The utterance mean m is a Gaussian random variable (R.V.) with mean $\lambda$ and variance $\sigma^2$.

$\sigma^2$ is fixed and known.

$\lambda$ in turn is a random variable with a prior distribution $p_0(\lambda)$.

For MAP estimation, a prior distribution that imposes constraints on the values of $\lambda$ must be chosen. We use conjugate priors for its mathematical attraction (see M. H. DeGroot, *Optimum Statistic Decisions*, New York: McGraw-Hill, 1970) and popularity for similar tasks (see J. L. Gauvain and C. H. Lee, "Maximum A Posteriori Estimation for Multivariate Gaussian Observations of Markov Chains," *IEEE Trans. on Speech and Audio Processing*, 2(2): 291–298, April 1994). A conjugate prior for a R.V. is the prior distribution for the parameter $\lambda$ of the pdf of the R.V., such that the posterior distribution $p(\lambda/X)$ and prior distribution $p_0(\lambda)$ belongs to the same distribution family for any sample size and any value of observation X. The conjugate prior for the mean of Gaussian density is known to be a Gaussian density:

$$p_0(\lambda) \triangleq N(\lambda; m_0, \sigma_0^2). \tag{8}$$

The MAP estimation of m has been extensively studied and the estimate is given by (see R. O. Duda and P. E. Hart, *Pattern Classification and Scene Analysis*, John Wiley & Sons, New York, 1973):

$$m_{MAP} = \frac{n\sigma_0^2}{\sigma^2 + n\sigma_0^2}\overline{m}_n + \frac{\sigma^2}{\sigma^2 + n\sigma_0^2}m_0 \tag{9}$$

where $\overline{m}_n$, given in Equation 5, is the ML estimate of the utterance mean from the data observed up to time n. Denote $$\rho \triangleq \frac{\sigma^2}{\sigma_0^2} \tag{10}$$

Equation 9 becomes:

$$m_{MAP} = \frac{n}{\rho+n}\overline{m}_n + \frac{\rho}{\rho+n}m_0 \tag{11}$$

We point out that if no sample is available (n=0) or the prior mean is known with certainty ($\rho=\infty$), then the MAP estimate of the mean is the prior mean $m_0$.

If sample size is very large (n=∞) or the prior mean is known with low certainty ($\rho=0$), then the MAP estimate of mean is the ML estimate of the mean.

In practice, to obtain a reliable estimate of the variance $\sigma_0^2$ is difficult because the unavailability of training data covering all potential testing environments. In addition, our recognition system is expected to work even in unknown environments. We therefore choose to adjust $\rho$ by experiments. Denote $$\alpha(n) \triangleq \frac{\rho}{\rho+n} \tag{12}$$

Equation 11 can be written $$m_{MAP}(n) = \alpha(n)m_0 + (1-\alpha(n))\overline{m}_n \tag{13}$$

We see that Equation 13 is a generalization of Equation 7 in that one can choose any functional form for $\alpha(n)$. Typically, $\alpha(n)$ is any decreasing function of the number of available frames. It is expected that such generalization could help to compensate the inaccuracy introduced by the assumptions made. Here we study two variants of $\alpha(n)$.

We can choose a piece-wise linear decay for $\alpha(n)$:

$$\alpha(n) = \begin{cases} 1, & \text{if } n = 0; \\ \max\left(\alpha(n-1) - \frac{D}{Z} \cdot 0\right), & \text{otherwise,} \end{cases} \tag{14}$$

where D is the time interval between two frames (frame rate) and Z is the frame where $\alpha(n)$ goes to (and stays at) 0.

Another possibility is $\alpha(n)$ exponentially decaying:

$$\alpha(n) = \begin{cases} 1, & \text{if } n = 0; \\ (\alpha(n-1) \cdot x\gamma, & \text{otherwise,} \end{cases} \tag{15}$$

where $0<\gamma<1$ controls the rate of exponential decay.

Figure 2:
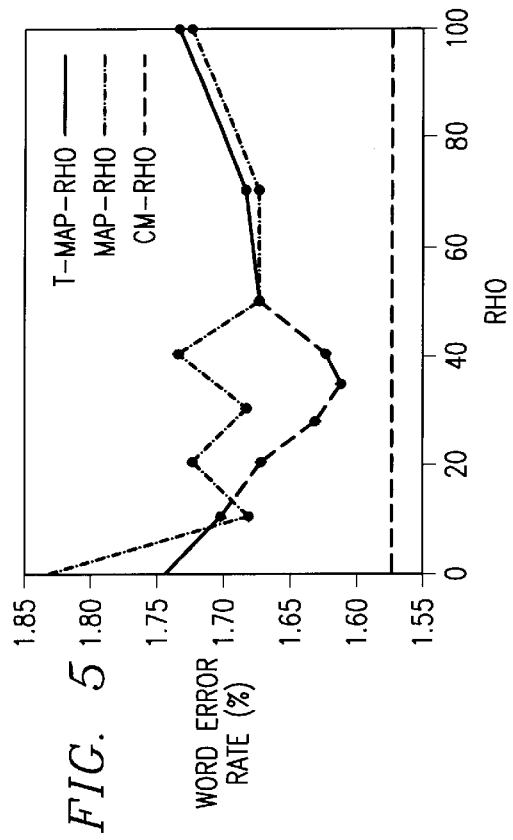
FIG. 2 is a chart illustrating typical 60 (n) values as a function of frame number for linear (Z=2300 ms, linear 2300) and exponential (γ=0.985, exp=0.985) decaying.

FIG. 2 shows two typical linear and exponential decays for a 20 ms frame rate.

Figure 3:
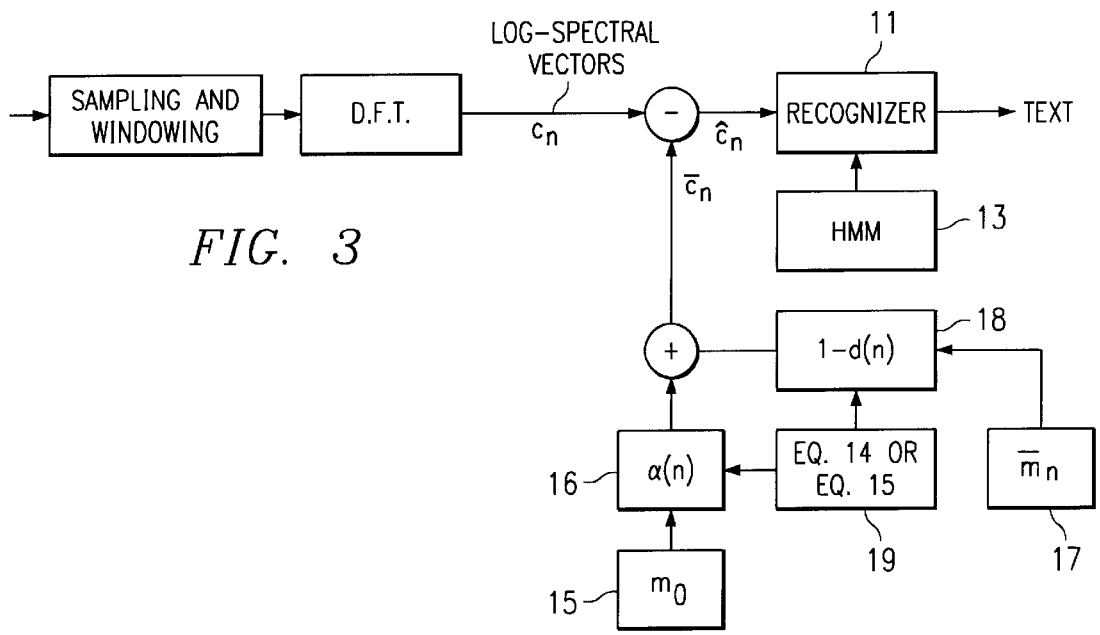
FIG. 3 illustrates a block diagram of the system according to one embodiment of the present invention.

Referring to FIG. 3 there is illustrated the recognizer according to one embodiment of the present invention. As in FIG. 1, there is the recognizer 11 and the source 13 of HMM models. The input signals are preprocessed before being applied to the recognizer 11. The mean over the training data $m_0$ at 15 is multiplied by one of the two variants determined by either Equation 14 (piece-wise linear MAP) or Equation 15 (exponential MAP) to get $\alpha(n)m_0$. The ML estimate of the utterance mean ($\overline{m}_n$) from the data observed up to time n is approximated by $$\triangleq \frac{1}{n}\sum_{i=1}^{n} c_i.$$

That is, at time n, $\overline{m}_n$ is calculated using those vectors observed up to time n only. This $\overline{m}_n$ is then multiplied by $1-\alpha(n)$ at 18 where $\alpha(n)$ again comes from either Equation 14 (piece-wise linear MAP) or Equation 15 (exponential MAP). The $\alpha(n)$ output from multiplier 16 and $1-\alpha(n)$ output from multiplier 18 are summed at summer 19 to get the log-spectral mean $\overline{c}_n$. The input signals are sampled, windowed, and transformed to produce the $n^{th}$ log-spectral vector $c_n$. The log-spectral mean $m_{MAP}(n)$ up to frame n is subtracted from the log-spectral vector $c_n$ to get the mean-subtracted vector $\hat{c}_n$ which is applied to the recognizer 11.

The validation of the techniques are based on a 7–10 connected telephone digit recognition task.

We use 8 kHz sampling rate, 20 ms frame rate with pre-emphasis. Observation vectors are $10^{th}$-order Linear Predictive Coding (LPC) derived 13 Mel Frequency Cepstral Coefficients (MFCC) with their regression-based first order time derivatives. Acoustic models are phonetic Gaussian Mixture Hidden Markov Models (GMHMM). The phone models are word-dependent. There are 47 models for digit recognition. The HMMs have on average about 5 states.

Speech data are from the MACROPHONE database (J. Bernstein et al., "Macrophone: An American Telephone Speech Corpus for the Polyphone Project," *Proc. of IEEE Internat. Conf. on Acoustics, Speech and Signal Processing*, volume I, pages 81–84, Adelaide, Australia, April 1994). To reduce training time, we used a subset of 1844 utterances from the training data set. The test was performed on the standard test data set containing about 1200 utterances.

Throughout the experiments, we used on average 4 Gaussians per state, which gives a WER of 1.57% with cepstral mean normalization (S. Furui, "Cepstral Analysis Technique for Automatic Speaker Verification," *IEEE Trans. Acoust., Speech and Signal Processing*, ASSP-29(2): 254–272, 1981) and 2.15% without.

For MAP estimation, the prior mean vector ($m_0$) is computed as the average of all cepstral vectors in the training subset.

In all figures showing WER curve below, three curves are displayed:
1. Training is performed with standard utterance-based CMN and test is performed with sequential mean estimation. The curve label starts with T-.
2. Training and testing all use sequential mean estimation.
3. Training and testing all use standard utterance-based CMN. The curve label starts with CM-.

TABLE 1

Description of result tables

Figure 7:
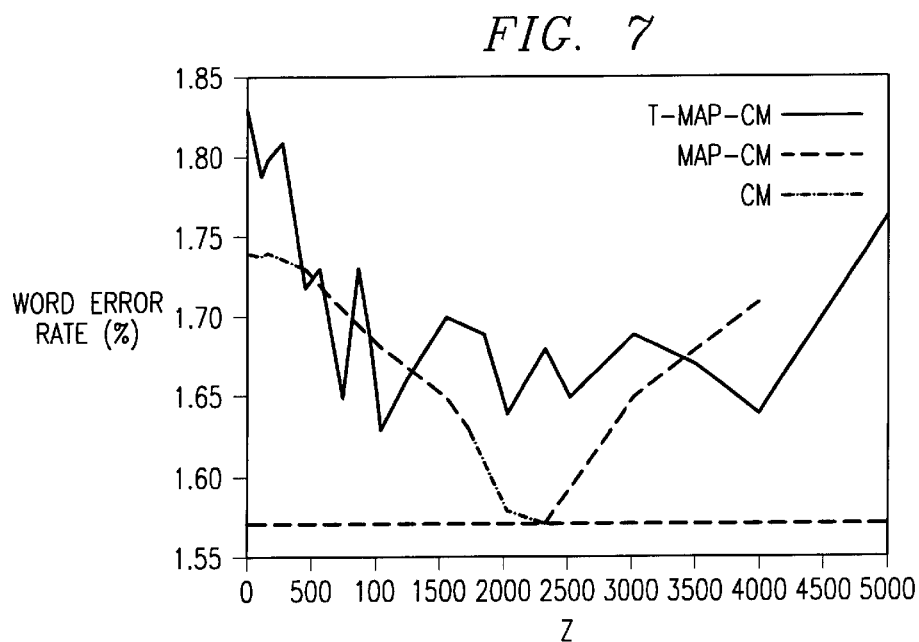
FIG. 7 illustrates word recognition error rates as functions of Z for linear weights (Equation 14).
Figure 4:
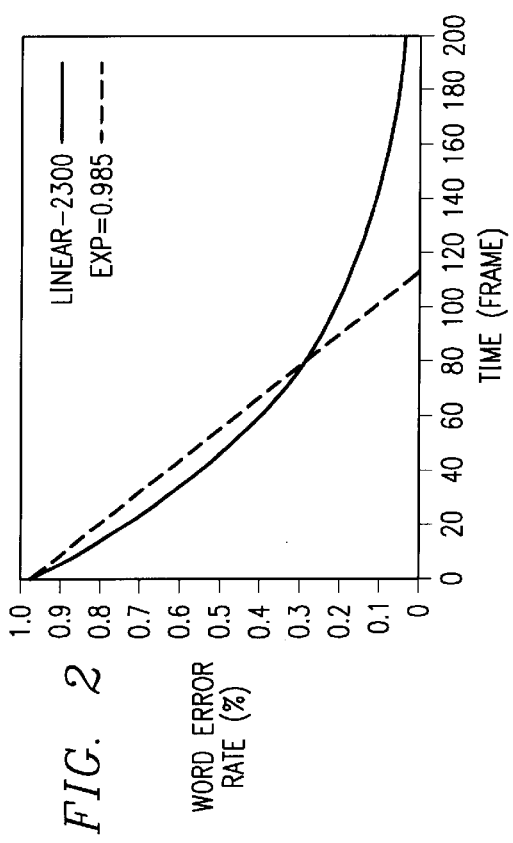
FIG. 4 illustrates word error rates as functions of ALPHA (α) for sequential cepstral mean subtraction (Equation 2)
Figure 5:
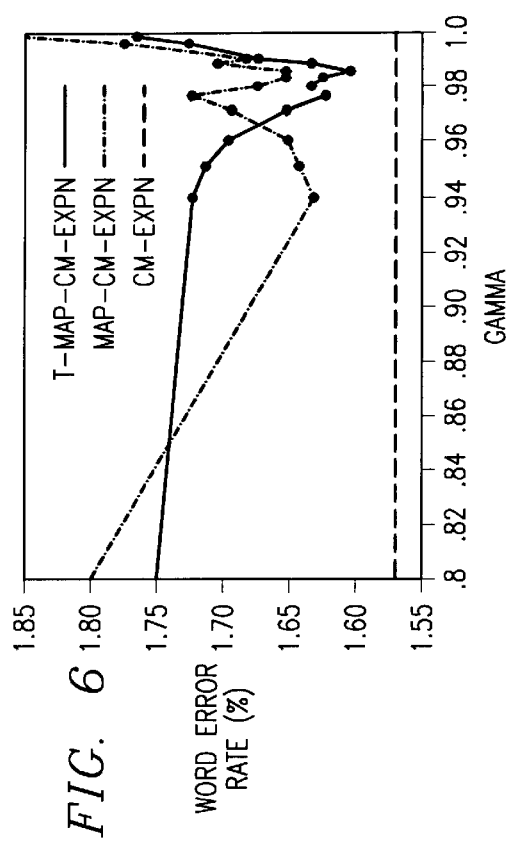
FIG. 5 illustrates word recognition rates as functions of Rho(p) for MAP cepstral mean estimation (Equation 11)
Figure 6:
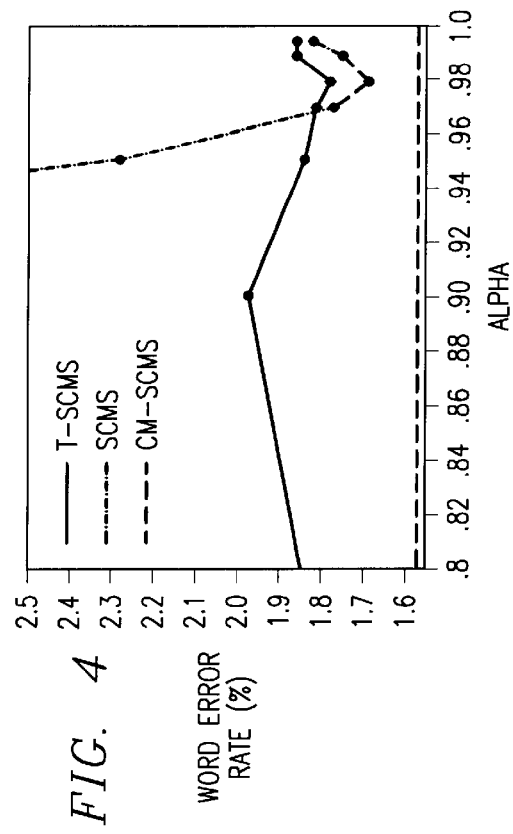
FIG. 6 illustrates word recognition error rates as functions of γ (GAMMA) for exponential weights (Equation 15)

| Description | Equation | Figure |
|---|---|---|
| Exponential smoothing | Equations 2,6 | FIG. 4 |
| $\rho$-controlled MAP | Equation 11 | FIG. 5 |
| Exponential MAP | Equation 15 | FIG. 6 |
| Piece-wise linear MAP | Equation 14 | FIG. 7 |

The content of the figures below is summarized in Table 1. Results for cumulative mean removal (Equation 5) are also shown in these figures as special points: $\rho=0$ for the $\rho$-controlled MAP (Equation 11); $\gamma=0$ for the exponential MAP (Equation 15); and Z=0 for the piece-wise linear MAP (Equation 14). The best WER for cumulative mean removal is 1.74 (corresponding to $\rho=0$ in the MAP Estimator of Equation 11).

TABLE 2

Lowest WER for each mean normalization technique

| Description | Equation | WER | Parameter |
|---|---|---|---|
| Cumulative mean removal | Equation 5 | 1.74 | N.A. |
| Exponential smoothing | Equation 2 | 1.69 | $\alpha = 0.98$ |
| $\rho$-controlled MAP | Equation 11 | 1.61 | $\rho = 35$ |
| Exponential MAP | Equation 15 | 1.60 | $\gamma = 0.985$ |
| Piece-wise linear MAP | Equation 14 | 1.57 | Z = 2300 |
| CMN | Equation 1 | 1.57 | N.A. |

Table 2 compares the lowest WER for each technique:
To do a cross-database validation, 1390 10-digit utterances from another database were recognized using the above CMN models and the parameter settings in Table 2, for Cumulative mean removal, $\rho$-controlled MAP, Piece-wise linear MAP, and CMN. The results are shown in Table 3.

TABLE 3

WER for each mean normalization technique on another telephone speech database

| Description | Equation | WER |
|---|---|---|
| Cumulative mean removal | Equation 5 | 2.53 |
| $\rho$-controlled MAP | Equation 11 | 2.39 |
| Piece-wise linear MAP | Equation 14 | 2.38 |
| CMN | Equation 1 | 2.09 |

From the results we observe the following:
1. Among the functional forms for $\alpha(n)$ that were tested, piece-wise linear approximation of MAP gives the best results. The optimal zero-crossing point for the linear decaying function is 2300 ms. Using a larger zero-crossing point will not help the WER because the prior mean $m_0$ will prevent the estimated mean from becoming utterance specific. It was reported (C. Mokbel, D. Jouvet and J. Monn, "Deconvolution of Telephone Line Effects for Speech Recognition," *Speech Communication*, 19(3): 185–196, 1996) that averaging cepstral vectors on a few seconds of speech produces a reliable estimate of the constant convolved perturbation.
2. All three MAP-bases techniques give noticeably better results than the two smoothing techniques. This shows that, at the beginning of an utterance, using prior mean gives a better estimate of the utterance mean.
3. The two tested generalized MAP all give better results than the traditional MAP estimation.
4. When sequential mean removal is used in both training and testing, the WER as a function of control parameters is irregular. This is probably due to the limited amount (1844) of utterances for training.
5. Training with CMN and testing with sequential mean removal gives lower WER than when training and testing both employ sequential mean removal.
6. Utterance-based CMN always gives the better results than sequential mean removal.

Experiments show that MAP with piece-wise linear approximation, which does not require any look-ahead and thus can operate real-time, gives the lowest WER among all tested sequential mean removal techniques and performs as well as whole utterance based mean removal.

What is claimed is:

1. A speech recognition system comprising:
a recognizer;
a generalized maximum a posteriori estimator for determining utterance log-spectral mean;
means for subtracting said utterance log-spectral mean from log-spectral vector of the incoming speech signal; and
means for coupling said means for subtracting to the input of said recognizer for providing mean subtracted vector of the input signal to said recognizer.

2. The recognition system of claim 1 wherein speech recognition models are also applied to said recognizer.

3. The recognition system of claim 2 wherein said speech models are HMM models.

4. The recognition system of claim 1 wherein said maximum a posteriori estimator follows the following equation of:

$$m_{MAP}(n)=\alpha(n)m_0+(1-\alpha(n))\overline{m}_n$$

where $m_0$ is mean of training data, $\overline{m}_n$ is the ML estimate of the utterance mean from the data observed up to time n and $$\overline{m}_n \stackrel{\Delta}{=} \frac{1}{n}\sum_{i=1}^{n} c_i$$

and $\alpha(n)$ is piece-wise linear MAP where $$\alpha(n) = \begin{cases} 1, & \text{if } n = 0; \\ \max\left(\alpha(n-1) - \frac{D}{Z}, 0\right), & \text{otherwise,} \end{cases}$$

where D is the time interval between two frames (frame rate) and Z is the frame where $\alpha(n)$ goes to and stays at 0.

5. The recognition system of claim 1 wherein the said generalized maximum a posteriori estimator follows the following equation of $$m_{MAP}(n)=\alpha(n)m_0+(1-\alpha(n))\overline{m}_n$$

where $m_0$ is mean of training data, $\overline{m}_n$ is the ML estimate of the utterance mean from the data observed up to time n and $$\overline{m}_n \stackrel{\Delta}{=} \frac{1}{n}\sum_{i=1}^{n} c_i$$

and $\alpha(n)$ is exponential decaying where $$\alpha(n) = \begin{cases} 1, & \text{if } n = 0; \\ \alpha(n-1)x\gamma & \text{otherwise,} \end{cases}$$

where $0<\gamma<$ controls the exponential decrease.

* * * * *